INVENTOR
Harry C. Schroeder

BY

ATTORNEY

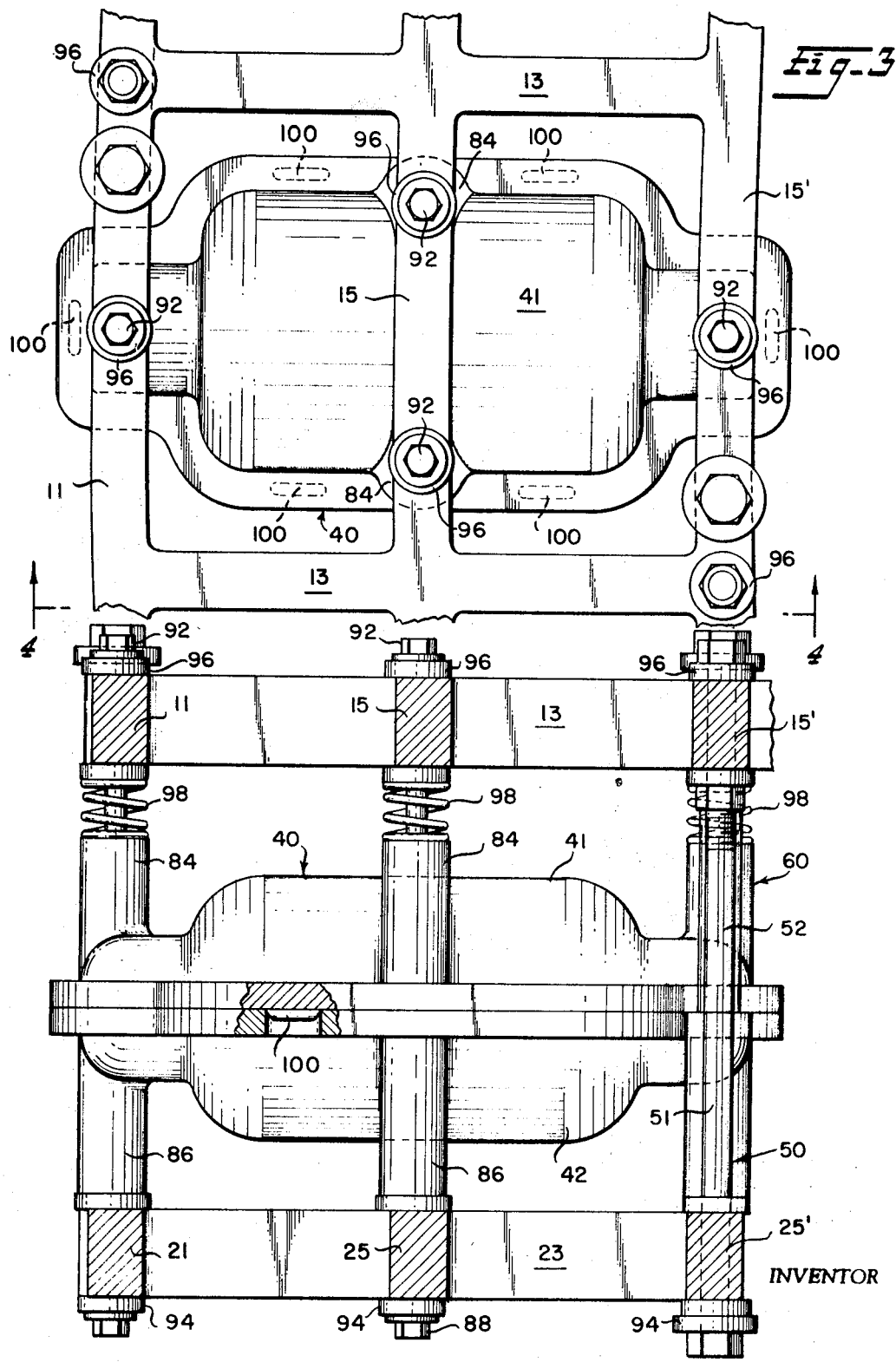

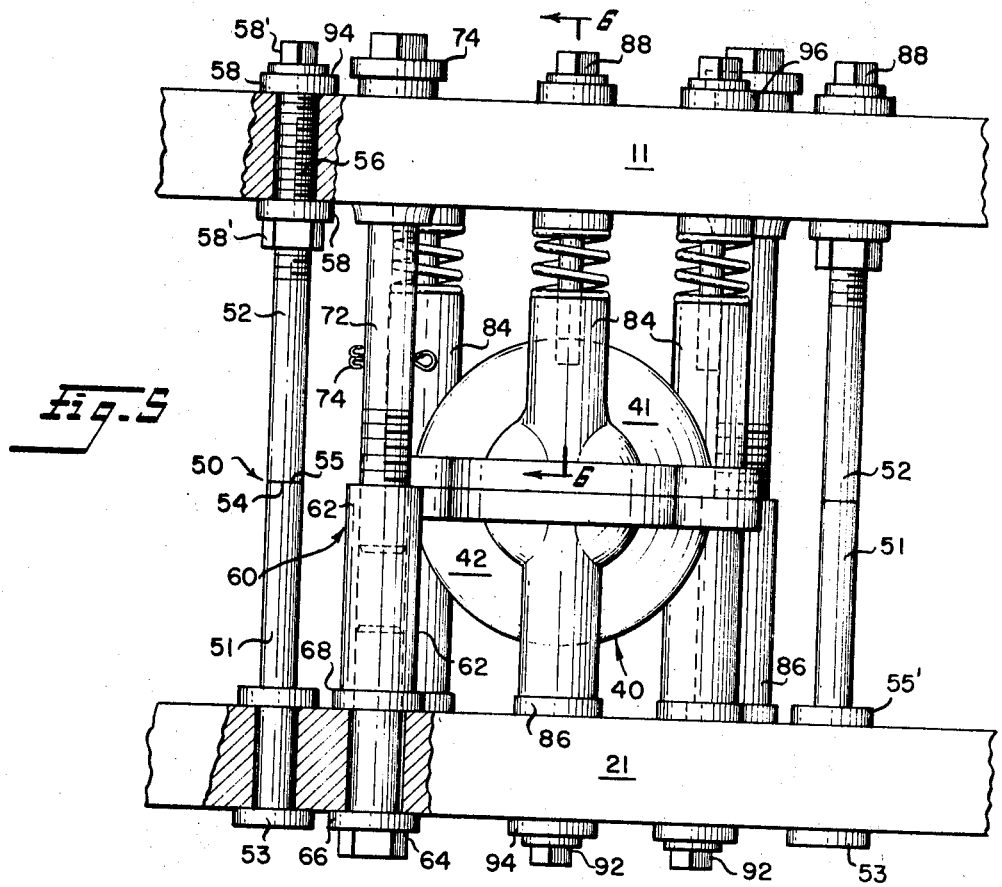
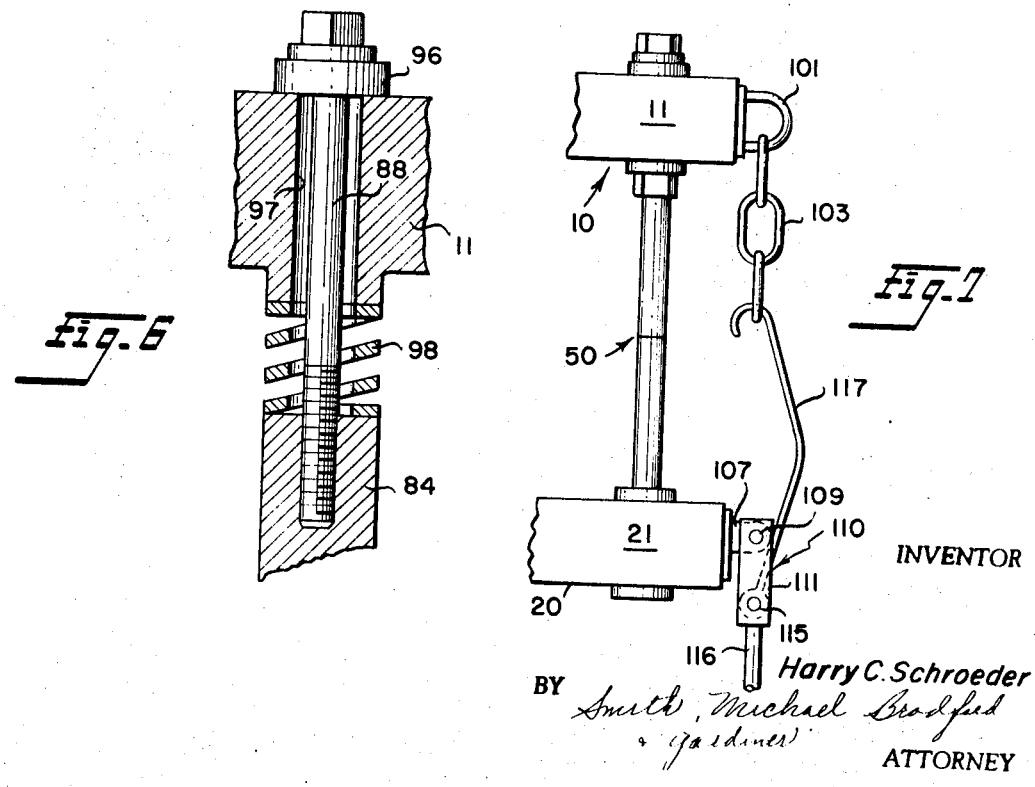

United States Patent Office 3,611,506
Patented Oct. 12, 1971

3,611,506
CENTRIFUGAL CASTING SPIDER AND MOLD
MOUNTING THEREON
Harry C. Schroeder, 1625 Graham Road,
Stow, Ohio 44224
Filed Apr. 30, 1969, Ser. No. 820,373
Int. Cl. B29c 5/04
U.S. Cl. 18—43                           7 Claims

ABSTRACT OF THE DISCLOSURE

High temperature steel centrifugal casting spiders have a different rate of expansion than the aluminum molds mounted thereon. The invention deals with means whereby the spiders when closed define a rigid structure between which aluminum mold halves are supported for freedom of expansion yet so closed that flashing on the molded product at the parting line between mold halves is virtually eliminated. Spring mounting means for the mold halves reduces mold breakage.

---

Figure 1:
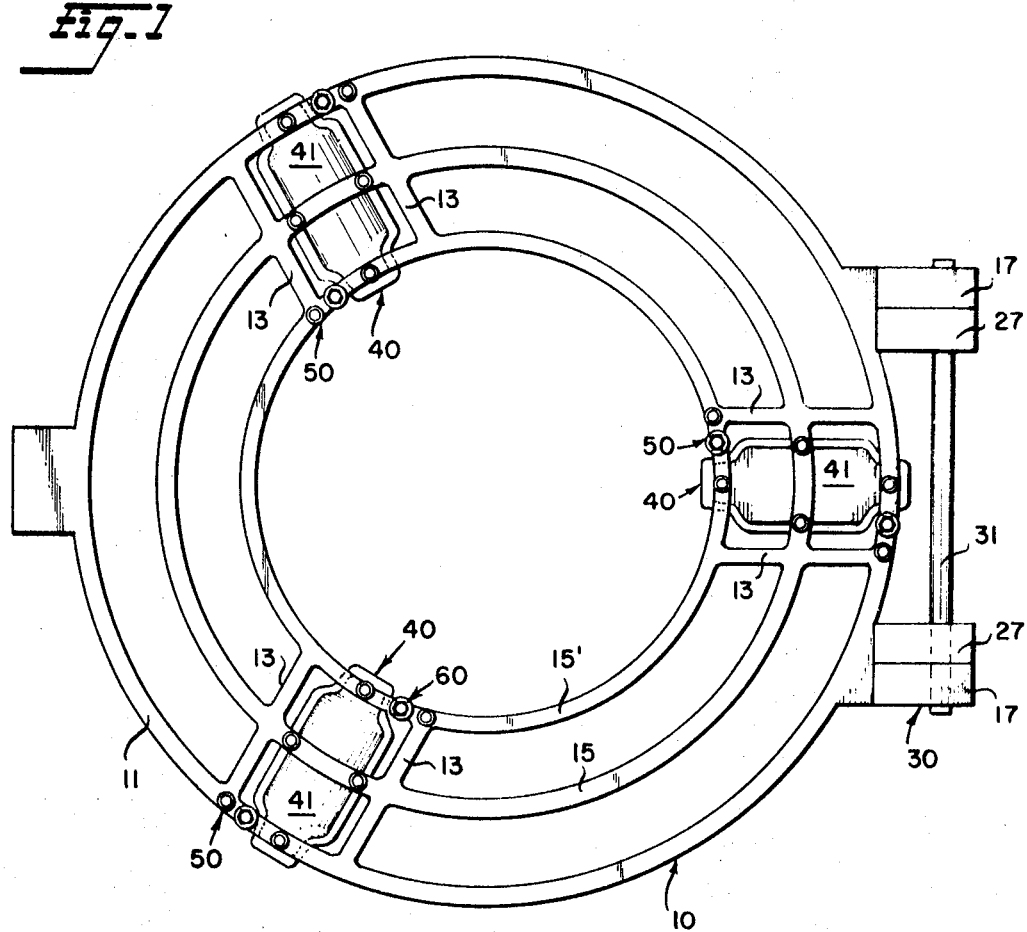

The present invention deals with apparatus for centrifugal casting of plastic products. In particular, it is directed toward the improvement of centrifugal casting spiders and the mounting of the molds thereon so that the products formed by the casting process are characterized by a lack of or absolute minimum of flash at the parting line between the molds. By way of background material, U.S. Pat. No. 2,784,454 illustrates the configuration of a typical casting spider as two wheel-like frames having the equivalent of spokes radiating out from a central hub. The two frames are hingedly connected to each other and are also provided with means whereby when they are in closed, i.e. superposed position, they may be bolted together in spaced relationship. The hinge means allows the frames to be swung apart.

The mold members are mounted on each frame in face-to-face relation and generally comprise two mold halves which when closed together in registry define a hollow mold means of a desired configuration into which are introduced thermo-responsive plastic raw materials to be formed into hollow articles having a configuration corresponding to that for which the molds are designed. Examples of such products are plastic balls, dolls' heads, horses, etc. to mention but a few items.

The molding step is carried out by heating the spiders and molds by any suitable means and either simultaneously or sequentially the entire spider is rotated about multiple axes to distribute the plastic material uniformly in a comparatively thin layer on the mold walls. Subsequently, the plastic is set or gelled by rapidly subjecting spider and molds to a cooling environment after which the spiders are unfastened, pivoted apart and the finished products removed.

Several problems have plagued the centrifugal casting industry as a whole. These are to obtain proper registry of the mold halves, when closed, and the necessary compensation of spider and molds for expansion and contraction having in mind the spiders are usually fabricated of steel for strength, while the mold parts are fabricated of aluminum because of its comparatively easy machinability and good heat transfer properties. If the slightest excess of pressure is created between the facing mold halves, the stresses, created by expansion and contraction thereof, will cause the molds to break, particularly where they are attached to the spider. On the other hand, too little pressure will result in mold warpage and a very excessive proportion of products with excessive flashing at the parting line of the mold halves. Removal of the flash is necessary and expensive because the cleaning is performed manually and is time consuming involving high labor costs at low production rates.

Both of these problems, instead of meeting with needed solutions, have been accentuated in more recent years due to the development of plastic materials which, while capable of moldability into more durable products, require higher molding temperatures. The higher temperatures obviously result in amplification rather than minimization of existing difficulties.

Accordingly, an object of this invention is to facilitate the molding of high temperature thermo-responsive plastics by centrifugal casting.

A further object of the invention is to prolong the life of centrifugal casting molds and spiders.

Another object of the invention is to facilitate the production of centrifugally molded articles which require a minimum of subsequent finishing.

More particularly, an object of the invention is to extend the life of centrifugal casting molds with attendant benefit of more economical production of articles so manufactured.

The stated objects and others not specifically set forth but apparent to those skilled in the art may be attained by providing rigid casting spiders formed of high temperature resistant steel, hingedly connecting said spiders one to the other for swinging movemnet about a fixed pivot from a position in spaced, parallel superposed relation to a second non-parallel position, means are provided on said spiders to interconnect them in fixed rigid parallel relation, said. means comprising threaded bolt and socket means interconnected between said spiders and an abutting stop means closely associated with but independent of said bolt means, said stop means including co-axial rod-like members adjustably mounted in each spider with their respective terminal ends in abutment when said spiders are closed; mold means including separable mold parts adapted when registered in face-to-face abutment to define a closed casting mold, means on said parts to register same and mounting means for fixing said mold parts on said spiders at least one of said means permitting movement of said mold part laterally and further biasing said part away from said spider on which mounted toward the opposite mold part and supporting spider.

Figure 2:
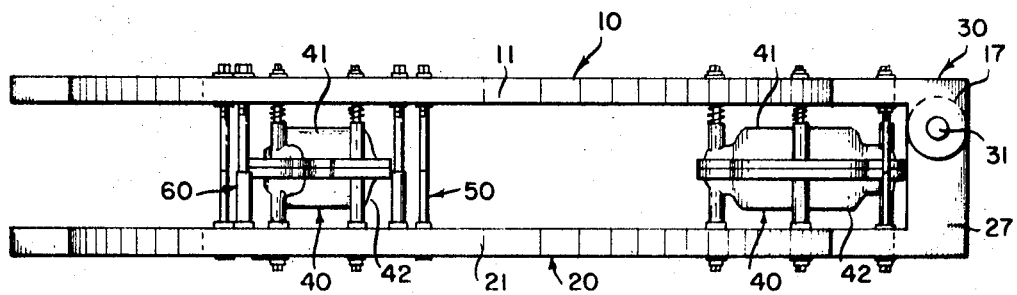

Having described the invention and its purposes in the light of existing techniques and structures, attention is directed to the following detailed material and drawings representing the best mode for practice of the invention and wherein FIG. 1 is a top view of a casting spider with only a limited number of molds shown for purposes of illustration, FIG. 2 is a side view of the assembly shown in FIG. 1, FIG. 3 is an enlarged top view of a section of a spider and mold mounted thereon, FIG. 4 is an enlarged side view of the structure shown in FIG. 3, FIG. 5 is a view similar to FIG. 4 but showing an end view of the mold, FIG. 6 is a sectional view through the mold mounting assembly taken along the line 6—6 of FIG. 5, and FIG. 7 is a partial elevational view showing a further form of quick-acting fastening means.

Considering first FIGS. 1 and 2 it will be seen that in general there is provided a centrifugal casting apparatus comprised of a pair of spiders 10 and 20 joined together by a hinge assembly 30. The spiders are illustrated as wheel-like in overall appearance having an outer peripheral rim 11 and 21, a series of radial spoke-like connecting members 13 and a plurality of concentric internal annular mold support members 15, 15'; the lower spider having identical parts identified by numerals 21, 25, 25'. These spiders are fabricated from high temperature resistant steel and may be fabricated by assembly and welding of the various elements from tubular or bar stock or, alternatively same may be cut out of plate stock of suitable thickness and temperature resistant characteristics.

The hinge assembly 30 is just a simple straight-forward connection including hinge pin 31 to which are connected hinge arms 17 of spider 10 and arms 27 of spider 20. It will be noted that the arms 27 are elongated such that when pivoted to a parallel position the spiders 10, 20 are separated a substantial distance. The space between the separated spiders and hence the length of arm 27 is purely arbitrary, being a function of the largest size of mold to be supported on the spiders. It is important however, to note that the hinge is a rigid hinge, that is, there is no movement between the hinge arms and pin 31 other than pivotal movement of one of the spiders with respect to the other about the axis of pin 31.

Though not shown, the conventional practice is to attach the spiders 10 and 20, to the terminal end of an arm of a machine which includes structure which, when molding is attempted, serves to support the spiders and move same in a circular path. At the same time, they are rotated about an axis passing through a plane parallel to the spiders whereby the material is distributed and subsequently fused or gelled into the finished product by first heating, then cooling of the molds as is conventional in the art.

As is also shown in FIGS. 1 and 2, the spiders 10 and 20 support casting molds 40 therebetween. For simplicity's sake the molds 40 are shown as being of elementary configuration and as having precisely symmetrical halves 41, 42 mounted on each of the spiders 10 and 20. It should be obvious that, depending on the configuration of the product, these details may vary considerably but each spider will support a portion of a mold which must register with and close against another portion of a mold to form a closed container.

As also shown in FIGS. 1 and 2, and in greater detail in FIGS. 3, 4 and 5, the spiders 10 and 20 are provided with spacer assemblies 50 and fastening assemblies 60 which serve to establish the relationship therebetween when the spiders are in operative position.

Each spacer assembly 50 is comprised of two rigid rods or bars 51, 52. As shown the rod 51 is fixed to spider 20 by simply passing same through a rim or spokes 21, 23, 25 or 25' and fixing same permanently in place by means of a head 53 and a washer which is slid down the rod 51 and welded in place so that the spider member is intermediate the two elements. The free end 55 of the bar 51 is machined or otherwise finished as to be perfectly planar and as parallel as possible to the spider to which it is attached.

The spacer bar 52 is also provided with a flat terminal end 54 adapted to meet the end 55 of bar 51. This bar, however, is adjustably fixed to the spider which carries it, in this case spider 10. The adjustability is readily accomplished by simply passing a threaded end 56 thereof through spider 10, i.e. rim 11, spoke 13 or annular member 15. Conventional washers 58 and nuts 58' are threaded on the rod and bear against the upper and lower surfaces of spider 10. It is believed obvious that adjustment is determined by the position of the nuts and washers on the bar.

In close proximity to each spacer assembly 50 is a spider fastening assembly 60. Each of these assemblies 60 is comprised of a tubular member 62 having internal threads, which member is affixed to one or the other of the spiders by any suitable means. As shown and as is obviously most practical, tubular member 62 is secured to lower spider 20 by means of a bolt passing through rim 21 and threaded into the tubular member 62. Preferably, washers 66, 68 are positioned on the bolt to either side of member 21 to relieve concentrations of stress where the bolt passes therethrough to thus avoid distortions and failures at the high temperatures required for casting powdered raw materials.

The upper part of the fastening assembly 60 comprises a threaded bolt 72 which may be threaded into the tubular member 62. Bolt 72 is slidably mounted for axial movement in upper rim member 11 of spider 10. Preferably, a washer 74 positioned adjacent the bolt head, again to reduce the likelihood of failure or distortion adjacent the bolt when the spider is exposed to high temperatures. In order to prevent the bolt 72 from being accidentally dislodged from the spider, a simple pin 74, similar to a cotter pin is passed axially therethrough about midway of the length thereof. Thus the bolt may be moved a sufficient distance to enable it to be readily engaged with and disengaged from the tubular member 62 with the spiders in closed relation.

From the foregoing description, it should be apparent that when the spiders 10 and 20 are closed, i.e. in opposed relation as shown in the drawings, the stop means 50 combined with fastening means 60 closely adjacent thereto contribute to enable them to be joined as a rigid structure, with the spiders spaced a precise distance apart and that, as a rigid structure made of the same material throughout, the rate of expansion and contraction throughout is equal. There cannot be, then, any warpage or distortion within the structure.

In FIG. 7 there is disclosed a modified fastening means which can be used to enable fast locking and unlocking of the spiders. This particular fastening means will be preferred where the particular cast product is a high volume or continuous production item wherein the molds are infrequently changed so that little, if any, stop and/or mold mounting adjustment is required.

As shown, spider 10 is provided with an eye element 101. A short length of temperature resistant chain 103 is, in turn, attached to eye element 101.

The lower spider 20 is provided with an over center hold down assembly 110. This assembly which may be, per se, readily purchased in the open market, comprises a base 105 attached to spider 20 as by bolts, screws or the like. The base 105 carries a bored lug 107. Pivoted on lug 107 by pin connector 109 is a yoke 111 provided with a handle 113. Connected to yoke 111 by a further pivot pin 115 is hook element 117 which can engage chain 103. As is apparent movement of the handle to the right will cause hook 117 to move vertically upwardly a sufficient distance whereby it may be disengaged from chain 103. Movement of the handle clockwise will produce the opposite result. The over center position of pins 109, 115 as shown assures that once closed the assembly 110 will keep the spiders in closed and locked condition.

The use of this type of interconnection is made possible by the fact that novel mounting means as will be described are provided.

Because of this arrangement and the fact that molds 40 are of aluminum having a fairly large expansion and contraction factor as compared with the steel spiders, a suitable mounting means must be provided to assure proper registration of mold parts 41 and 42, yet at the same time, permit these parts to expand and contract at a different rate than spiders 10 and 20.

The mold parts 41 and 42 are cast with mounting lugs 84, 86 integral with the body of the mold. Each lug is drilled and tapped to provide for its threaded connection with conventional mounting bolts 88, 92 which pass through the spiders 10 and 20 and various points on rims 13, 23, etc., as may be required to assure support during the casting operation. Preferably, washers 94, 96 form stress distributing bosses on spiders 10 and 20.

As shown in FIG. 4 the mounting lugs 86 of the one mold part rest directly on spider 20. However, the mounting lugs for the other mold half in this case the upper half, are spaced from spider 10 and coil springs 98 are interposed between the ends of lugs 84 and the spider 10. The springs 98 are high temperature resistant steel springs and may be readily purchased in the open market. As clearly shown in FIG. 6, the bolts 88 pass through suitable apertures 97 in spider 10. These apertures 97 are substantially larger in diameter than that of the mounting bolts 88. Similarly, the apertures in spider 20 are considerably larger than that of bolts 92. Thus the bolts may move with the apertures relative to spiders 10 and 20 even though they may be tightened sufficiently to keep the molds on the spiders 10 and 20. Thus, even though the difference in materials, steel spiders and aluminum molds, results in differential rates of expansion, the floating mounting of the molds on the spider permits of the relative movement between the parts without the development of stress in the molds.

In respect of mold registration, it should be noted that the mold halves are provided with registration pins as is customary in the art. Even more preferable, however, is the use of molds embracing the novel registration lugs 100 as described in the earlier filed, copending application of Harry C. Schroeder, Ser. No. 777,646, "Centrifugal Casting Mold," filed Nov. 21, 1968. As the spiders are closed, then, the registration lugs 100 assure that the mold halves are in proper alignment to produce a finished product. In mounting of the upper mold halves 41 on spider 10 it is preferable that bolts 88 are threaded far enough into the mold mounting lugs 84 so as to pre-compress the springs 98 to a limited degree. Then as the spider fasteners 60 are engaged and drawn down to the limits permitted by stop members 50 between the spiders 10 and 20, the compression of springs 98 is increased, the heads of bolts 88 lifting from the spider 10 so that the springs alone govern the total compression forces holding the mold halves 41, 42 together. By this arrangement sufficient force is exerted to prevent parting line flash on the product yet, as indicated the mold halves as an integrated unit may expand and contract due to heating and cooling completely independent of the spiders themselves.

Having described the preferred form of the invention, what is claimed is:

1. In combination with a pair of identical steel casting spiders having mold mounting apertures therein; hinge means connecting said spiders, one to the other, for relative swinging movement from a superposed to an open position and vice versa, means for fastening said spiders together as a rigid unit and in spaced parallel relation when in a closed position, said means including stop means acting between said spiders; mold means comprising registerable, aluminum mold parts, one each of which is mounted on one each of said spiders to define closed casting molds when the spiders are closed; a plurality of mounting means having a resilient member acting between at least one of said spiders and said mold parts mounted thereon for retaining said mold parts on said spiders, said mounting means each including fastener means passing through said mounting apertures in said one spider toward its associated mold means, said mold mounting apertures being diametrically larger than said fastening means; means retaining said fastener means within said apertures but permitting free lateral movement of said fastener means, said resilient member surrounding said fastener means and exerting a biasing force tending to oppose movement of a mold part toward said spider; the mold parts attached to the other of said spiders being fastened thereto so as to permit only lateral movement of said mold parts relative to said spider whereby the differential rates of expansion and contraction between said spiders and said mold parts due to the different characteristics of the material of which each is fabricated will not result in breakage of the mold parts.

2. In combination, the structure of claim 1 wherein said stop means is comprised of a plurality of rigid steel rodlike members mounted on each spider for co-terminal abutment and having planar terminal ends adapted for firm contact when the spiders are in a closed position.

3. In combination, the elements defined in claim 2 wherein said fastening means comprises a plurality of threaded sleeves mounted on one of said spiders and a plurality of threaded bolts mounted on the other of said spiders for engagement with said sleeves, there being a fastening means closely adjacent and corresponding in number to each of the stop means.

4. In combination, the elements defined in claim 2 wherein said fastening means is each comprised of a hook-receiving means attached to one of said spiders and hook means attached to the other of said spiders and means carrying said hook means whereby the effective length thereof may be varied to lock the spiders in closed position or to release said hook means from said hook-receiving means to facilitate opening of said spiders.

5. In combination, the structure defined in claim 1 wherein said resilient member is comprised of a high temperature resistant coil spring interposed between said mold part and said spider.

6. In combination, the elements as defined in claim 5 wherein said spring means is under compression at all times.

7. In combination, the elements as defined in claim 1 wherein said mold parts are provided with means for registering said parts when the spiders are closed.

References Cited

UNITED STATES PATENTS

| 3,000,056 | 9/1961 | Parsch | 18—26 RX |
| 679,498 | 7/1901 | Cross | 18—39 X |
| 2,784,454 | 3/1957 | Miller | 18—16 R |

FOREIGN PATENTS

| 1,189,646 | 3/1959 | France | 18—26 A |
| 1,220,997 | 7/1966 | Germany | 18—26 A |

OTHER REFERENCES

"Rotational Molding of Plastisols," by Samuel Zweig, from September 1955 issue of Modern Plastics.

J. SPENCER OVERHOLSER, Primary Examiner

D. S. SAFRAN, Assistant Examiner

U.S. Cl. X.R.

18—26 R. 26 RR